(12) United States Patent
Pit Rada et al.

(10) Patent No.: US 10,834,331 B2
(45) Date of Patent: *Nov. 10, 2020

(54) BLURRING A DIGITAL IMAGE (71) Applicant: FotoNation Limited, Galway (IE)

(72) Inventors: Cosmin Pit Rada, Bucharest (RO); Cosmin Stan, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,205

(22) Filed: Jul. 3, 2019

(65) Prior Publication Data

US 2020/0007791 A1 Jan. 2, 2020

Related U.S. Application Data (63) Continuation of application No. 15/134,605, filed on Apr. 21, 2016, now Pat. No. 10,348,979.

(Continued)

(51) Int. Cl.
*H04N 5/262* (2006.01)
*G06T 5/00* (2006.01)
(Continued)

(52) U.S. Cl.
CPC .......... *H04N 5/2621* (2013.01); *G06T 5/002* (2013.01); *G06T 5/20* (2013.01); *G06T 11/001* (2013.01);
(Continued)

(58) Field of Classification Search
CPC .. H04N 5/2621; H04N 5/23229; G06T 5/002; G06T 5/20; G06T 11/001;
(Continued)

(56) References Cited

U.S. PATENT DOCUMENTS 3,925,650 A * 12/1975 Brown .................... G06F 17/15
702/70
2013/0236117 A1* 9/2013 Lee ........................ G06T 5/002
382/264

* cited by examiner

*Primary Examiner* — Antoinette T Spinks
(74) *Attorney, Agent, or Firm* — Lee & Hayes, PC (57) ABSTRACT A method is disclosed for processing at least a portion of an input digital image comprising rows of pixels extending in two mutually perpendicular directions over a 2D field. The method comprises defining a kernel for processing an image, the kernel comprising at least one row of contiguous elements of the same non-zero value (such rows being referred to herein as equal-valued kernel regions), the equal-valued kernel regions, if more than one, extending parallel to one another. For each pixel in at least selected parallel rows of pixels within the image portion, the cumulative sum of the pixel is calculated by adding a value of the pixel to the sum of all preceding pixel values in the same row of the image portion. The kernel is convolved with the image portion at successive kernel positions relative to the image portion such that each pixel in each selected row is a target pixel for a respective kernel position. For each kernel position, the convolving is performed, for each equal-valued kernel region, by calculating the difference between the cumulative sum of the pixel corresponding to the last element in the equal-valued kernel region and the cumulative sum of the pixel corresponding to the element immediately preceding the first element in the region, and summing the differences for all equal-valued kernel regions. The differences sum is scaled to provide a processed target pixel value.

20 Claims, 8 Drawing Sheets

Related U.S. Application Data (60) Provisional application No. 62/150,663, filed on Apr. 21, 2015.

(51) Int. Cl.
 *G06T 5/20* (2006.01)
 *G06T 11/00* (2006.01)
 *H04N 5/232* (2006.01)

(52) U.S. Cl.
 CPC .............. *H04N 5/23229* (2013.01); *G06T 2207/10004* (2013.01); *G06T 2207/20024* (2013.01); *G06T 2207/20092* (2013.01)

(58) Field of Classification Search
 CPC . G06T 2207/10004; G06T 2207/20024; G06T 2207/20092
 See application file for complete search history.

BLURRING A DIGITAL IMAGE

CROSS REFERENCE TO RELATED APPLICATIONS

The present application is a U.S. Non-Provisional Patent Application claiming the benefit of priority of U.S. Provisional Patent Application No. 62/150,663, filed on Apr. 21, 2015, and of PCT Patent Application No. PCT/EP2016/057242 filed on Apr. 1, 2016, the content of which is expressly incorporated by reference herein in its entirety.

FIELD

The present invention relates to a method of processing a digital image.

BACKGROUND

As used herein, a digital image comprises an 20 orthogonal array of pixels, i.e. rows of pixels extending in two mutually perpendicular directions over a 2D field and conventionally referred to as horizontal rows and vertical columns of pixels. However, such terminology is used herein for convenience and does not imply any particular orientation of the image.

In digital image processing a kernel is a subset of a matrix of elements arranged in orthogonal rows and columns. In the matrix each element may have a value of zero or a positive or negative non-zero number. The non-zero matrix elements form the kernel itself. The zero elements take no part in the processing. Conventionally, to process a digital image comprising orthogonal rows and columns of pixels, the kernel is stepped from one pixel to the next along successive rows of the image (actually the image pixels could be processed in any order, but it is easier to conceptualise pixel by pixel processing along successive rows). At each position of the kernel relative to the image each kernel element is notionally aligned with a respective corresponding image pixel; i.e. the kernel defines a set of image pixels having the same shape as the kernel. At each such position of the kernel the value of each image pixel is multiplied by the value of the corresponding element of the kernel, the individual multiplication products are summed, and the sum (if necessary after normalisation) replaces the existing value of the current target pixel. The target pixel is a pixel bearing a fixed relationship to the kernel. In a bi-symmetrical kernel the target pixel is usually the pixel currently corresponding to the centre element of the kernel, but it need not be and may be outside the kernel. See http://williamson-labs.com/convolution-2d.htm. Such processing is known in the art as convolution.

Such processing is of wide applicability and can be used, for example, for edge detection, high and low pass filtering, and simulating optical blurring. However, the standard technique as described above is computationally intensive when operating on large images with big kernels. For example, to process an image W pixels wide by H pixels high using a K×K kernel takes $O(W \times H \times K \times K)$ operations, where O=the order of.

WO2007/095477 (Ref: FN-140) discloses blurring an image based on acquiring two images of nominally a same scene taken at a different light exposure levels. Typically, a foreground region of one of the images includes pixels having saturated intensity values. For at least one of the other saturated pixels, values are extrapolated from the other image. At least a portion of a third image is blurred and re-scaled including pixels having the extrapolated values.

US2014/0192233 discloses causing a primary exposure and an effects exposure of a scene to be captured via a digital imaging sensor. During at least the effects exposure, the scene is shifted in a predetermined pattern relative to the digital imaging sensor via an image stabilizing device. The effects exposure and the primary exposure are then combined to form a digital image.

SUMMARY

The present invention is concerned with generating heavily blurred images in a computationally efficient manner, for example, generating: bokeh blur, motion blur, spin blur and/or zoom blur.

According to the present invention there is provided a method of processing at least a portion of an input digital image comprising rows of pixels extending in two mutually perpendicular directions over a 2D field, the method comprising:

defining a kernel for processing an image, the kernel comprising at least one row of contiguous elements of the same non-zero value (such rows being referred to herein as equal-valued kernel regions), said equal-valued kernel regions, if more than one, extending parallel to one another;

for each pixel in at least selected parallel rows of pixels within said image portion, calculating the cumulative sum of said pixel by adding a value of said pixel to the sum of all preceding pixel values in the same row of said image portion;

convolving said kernel with the image portion at successive kernel positions relative to said image portion such that each pixel in each selected row is a target pixel for a respective kernel position, wherein for each kernel position said convolving is performed, for each equal-valued kernel region, by calculating the difference between the cumulative sum of the pixel corresponding to the last element in the equal-valued kernel region and the cumulative sum of the pixel corresponding to the element immediately preceding the first element in said region, and summing said differences for all equal-valued kernel regions; and scaling said differences sum to provide a processed target pixel value.

The pixel array of the digital image may be represented by Cartesian coordinates or polar coordinates.

The method may be applied to the entire image or a sub-sampled set of pixels.

The invention exploits the hereto unrecognised fact that processing can be significantly reduced, even for large kernels and large images, if the kernel is a relatively simple geometric shape (e.g. circle, diamond, heart) so that there is a large amount of overlap in the kernel positions for consecutive image pixels.

BRIEF DESCRIPTION OF THE DRAWINGS

Embodiments of the present invention will now be described, by way of example, with reference to the accompanying drawings, in which.

DESCRIPTION OF THE EMBODIMENTS

Figure 1:
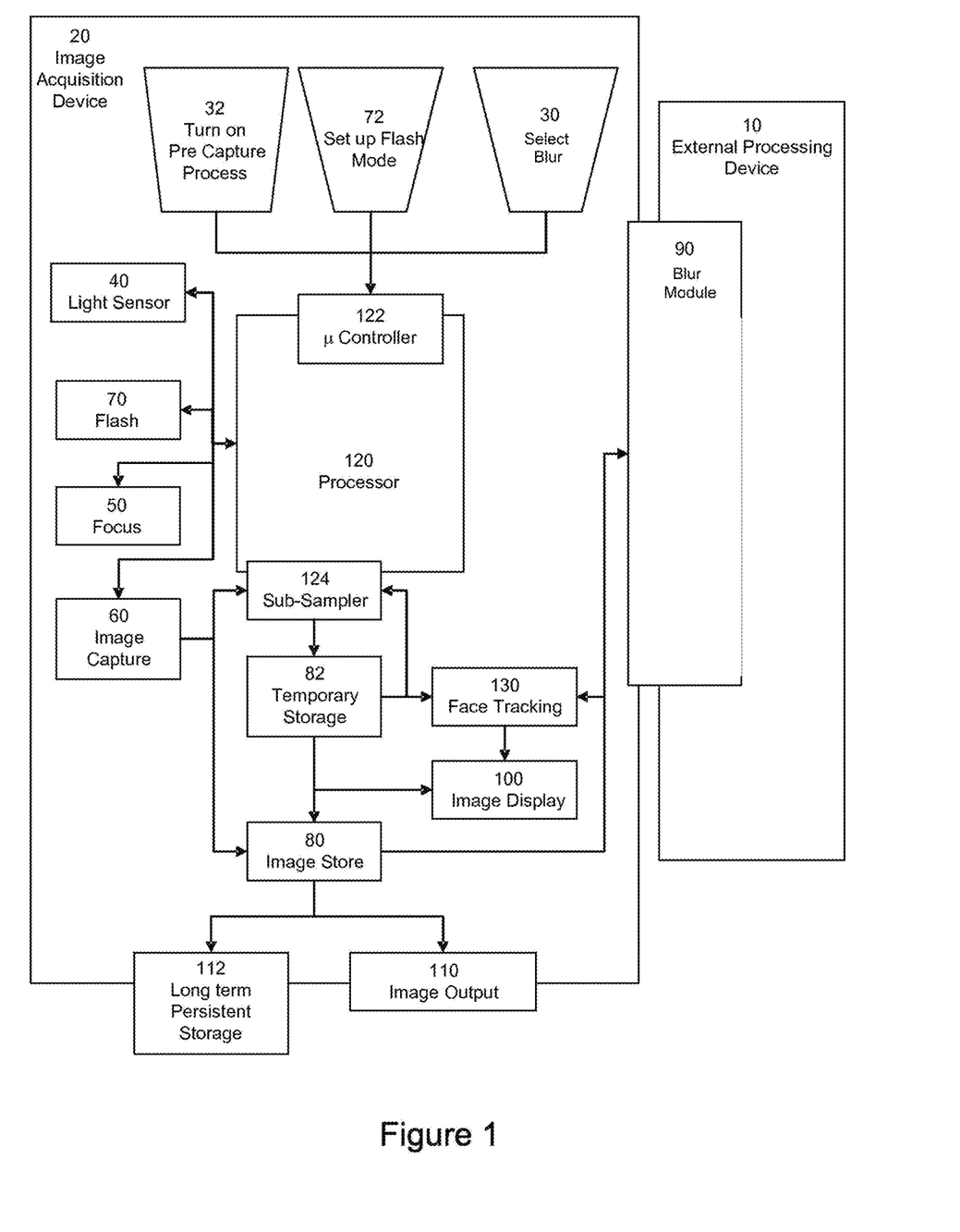
FIG. 1 is a block diagram of an image acquisition device.

FIG. 1 is a block diagram of an image acquisition device 20, which in the present embodiment is a portable digital camera, operating in accordance with certain embodiments. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display are controlled by a microcontroller 122.

In operation, the processor 120, in response to a user input to microcontroller 122 such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by the image capture device 60 is stored in an image store 80 which may comprise computer memory such a dynamic random access memory or a non-volatile memory. The camera is equipped with a display 100, such as an LCD, both for displaying preview images and displaying a user interface for camera control software. Typically displays such as the display 100 are touch screen displays readily enabling user interaction with applications running on the image acquisition device 20.

In the case of preview images which are generated in the pre-capture mode 32 with the shutter button half-pressed, the display 100 can assist the user in composing the image, as well as being used to determine focusing and exposure. Temporary storage 82 is used to store one or plurality of the stream of preview images and can be part of the image store 80 or a separate component. The preview image is usually generated by the image capture device 60. For speed and memory efficiency reasons, preview images may have a lower pixel resolution than the main image taken when the shutter button is fully depressed, and can be generated by sub-sampling a raw captured image using software 124 which can be part of the general processor 120 or dedicated hardware or combination thereof.

In the present embodiment, the device 20 includes a face detection and tracking module 130 such as that described, for example, in PCT Publication No. WO2008/018887 (Ref: FN-143)

The device 20 further comprises a user selectable blur module 90. The module 90 may be arranged for off-line blurring of acquired digital images in an external processing device 10, such as a desktop computer, a colour printer or a photo kiosk. However, the module 90 may alternatively be implemented within the camera 20. Although illustrated as a separate item, where the module 90 is part of the camera, it may be implemented by suitable software on the processor 120.

The blurred image may be either displayed on image display 100, saved on a persistent storage 112 which can be internal or a removable storage such as CF card, SD card or the like, or downloaded to another device via image output means 110 which can be tethered or wireless.

Figure 2:
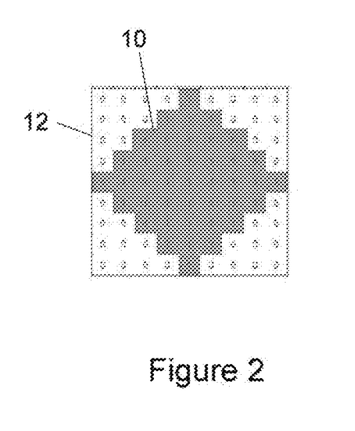
FIG. 2 shows a diamond-shaped kernel defined as a subset of a 9×9 matrix.

The blur module 90 can be brought into operation upon user demand via an input 30, which may be a dedicated button or a dial position on the device 20. In this embodiment, the selection of the input 30 presents on the display 100 a menu of different selectable kernel shapes based on, in this case, a 9×9 matrix. Typically the kernels may include a circle, a diamond, a star and a heart. The menu may also have an entry which allows the user to define his own kernel by selecting arbitrary elements of the matrix. All the elements of the kernel have the value 1, and the rest of the matrix (which plays no part in the processing and which in fact may be a notional construct simply for the purpose of defining the kernel) has elements of value zero. For example, FIG. 2 shows a diamond-shaped kernel 10 defined as a subset of a 9×9 matrix 12, the kernel elements all being 1. The menu also allows the user to select a desired type of blur, e.g. bokeh blur, motion blur, spin blur and zoom blur, each of which has a default kernel but this may be replaced by any of the selectable kernels or a user-defined kernel. Having selected the type of blur, and a particular kernel if the default is not used, the user selects an "apply" menu entry which causes the blur module 90 to convolute the kernel with the digital image in the following manner, in which it is assumed that the diamond-shaped kernel of FIG. 2 is used. Further details of the user interface to the blur module 90 are described below.

Figure 3:
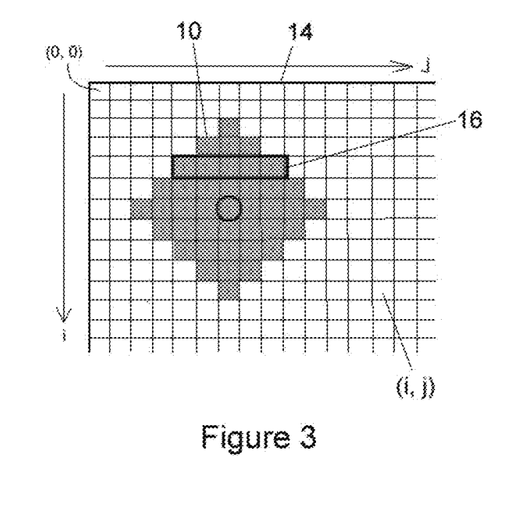
FIG. 3 shows the kernel of FIG. 2 superimposed on a digital image.

FIG. 3 shows the kernel 10 superimposed on a digital image 14 having i rows and j columns, of which only the top left portion is shown, with the origin (0, 0) at the top left corner. The intensity of any arbitrary image pixel is I(i, j).

The intensity value I for any given pixel i, j can be provided in any number of ways. For example, for an image in R,G,B format, the blurring process can be carried out on each plane individually with I corresponding to the R, G and B values respectively. Indeed blurring need not be performed on all colour planes.

Other embodiments of the present invention are particularly suitable for images in a color space where there is separation between intensity/luminance and chrominance, e.g. YCC or LAB, where one image plane, in these cases, Y or L provides a greyscale luminance component. In such cases, the Y or L plane of an image can provide the intensity values I to be blurred.

For each position of the kernel 10 relative to the image 14 the current target pixel is aligned with the centre element (circled) of the kernel. Conventionally, the kernel 10 would be stepped pixel by pixel along each row i of the image and at each position of the kernel, such as the position shown in FIG. 3, the intensity value I of the target image pixel would be replaced by the sum of the intensity values of all the pixels currently aligned with the 41 kernel elements. It will be noted that the pixel values are simply summed because all the kernel elements are 1, and therefore the pixel values are not weighted.

In contrast to the heavily intensive processing provided by the conventional method, the embodiment of the invention processes the image as follows.

1. First, the module 90 calculates what is referred to herein as the cumulative sum of each image pixel. The cumulative sum of a pixel is the sum of the intensity value of that pixel and the intensity values of all pixels to the left of it in the same row. Thus:

$$sum[i,j1]=I[i,1]+I[i,2]+I[i,3]+\ldots I[i,j]$$

where sum=cumulative sum and I=pixel intensity value.

However, rather than individually summing all the preceding pixel values in a row for each pixel, in the present embodiment the following simplified formula is used:

$$sum[i,j]=[i,j-1]+I[i,j]$$

where sum[i, 0) is defined to be zero. That is to say, the cumulative sum of a given pixel is the cumulative sum of the immediately preceding pixel in the row plus the value of the given pixel.

2. Next, the kernel is analysed into horizontal regions of contiguous elements having the same kernel value. In the case of the kernel of FIGS. 2 and 3 all the kernel elements have the value 1, so there are 9 such horizontal regions, having 1, 3, 5, 7, 9, 7, 5, 3, 1 contiguous elements respectively from top to bottom. As an example, the 5-element horizontal region 16 extending from 45, 4) to (4, 8) is shown outlined in FIG. 3. As will be noted below, it is not necessary that all the kernel elements have the same value, but for the present embodiment it is assumed that they are all 1.

3. Now, for each target pixel, the sum of the pixels corresponding to each horizontal region is calculated as the difference between the cumulative sum of the pixel corresponding to the last element of the region and the cumulative sum of the pixel immediately preceding the first element of the region. Thus, if the horizontal element extends from (i, p) to (i, q) the sum of the pixels is:

$$I[i,p+1]+I[i,p+2]+\ldots I[i,q]$$

which in the present embodiment is more simply calculated as:

$$sum[i,q]-sum[i,p-1]$$

4. Finally, for each target pixel, this sum is calculated for all the horizontal regions of the kernel, and the results added together to obtain the desired sum of the intensity values of all the pixels currently aligned with the kernel elements. This final sum replaces the value of the target pixel, if necessary or desired after scaling, for example, by dividing the result by the number of kernel elements.

It can be shown that an image W pixels wide by H pixels high using a K×K kernel takes O(W×H×K) operations, rather than the O(W×H×K×K) operations of the conventional technique.

Figure 4:
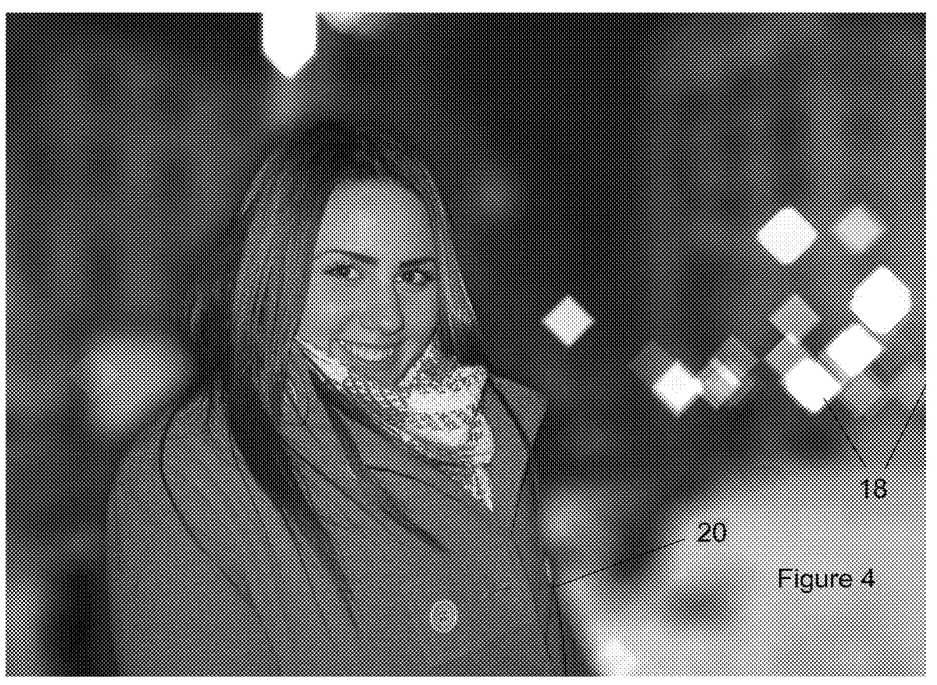
FIG. 4 shows an example of an image with bokeh blur produced by a diamond-shaped kernel according to an embodiment of the invention.

FIG. 4 shows an example of an image with bokeh blur produced by the above method using a diamond shaped kernel. As can be seen, point highlights on the right hand side of the image are rendered as diamond-shaped regions 18 simulating the effect of an optical system.

The above method can be used for other kinds of blur. For example, for horizontal motion blur, FIG. 5, the method described above can be applied using a one-dimensional (1D) horizontal kernel, i.e. a kernel consisting of only one horizontal region. Actually, more than one horizontal region could be used, as long as the shape of the overall kernel is highly elongated in the horizontal direction.

Figure 5:
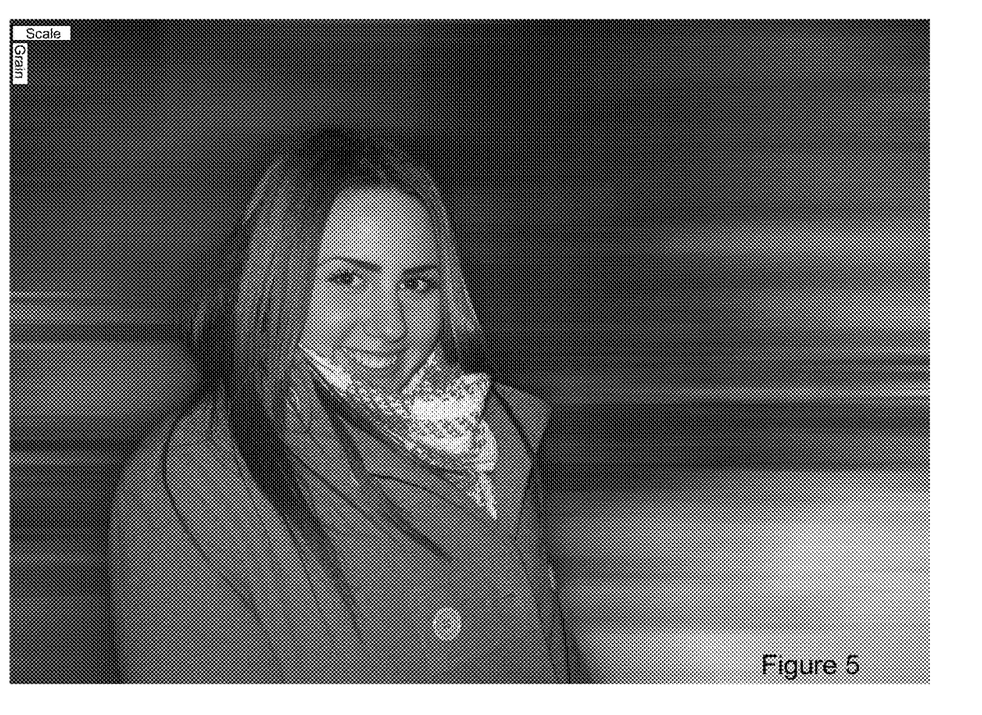
FIG. 5 shows an example of an image with horizontal motion blur using an embodiment of the invention.

For the motion blur technique illustrated in FIG. 5 the granularity of the blurring strata can be determined by sub sampling the original image. So for the finest blurring strata, a 1D kernel can be applied to each row of an image, whereas for more discrete strata, a 1D kernel might be applied to every Nth row of an image with the blurred values applying to N rows of the original image.

Figure 6:
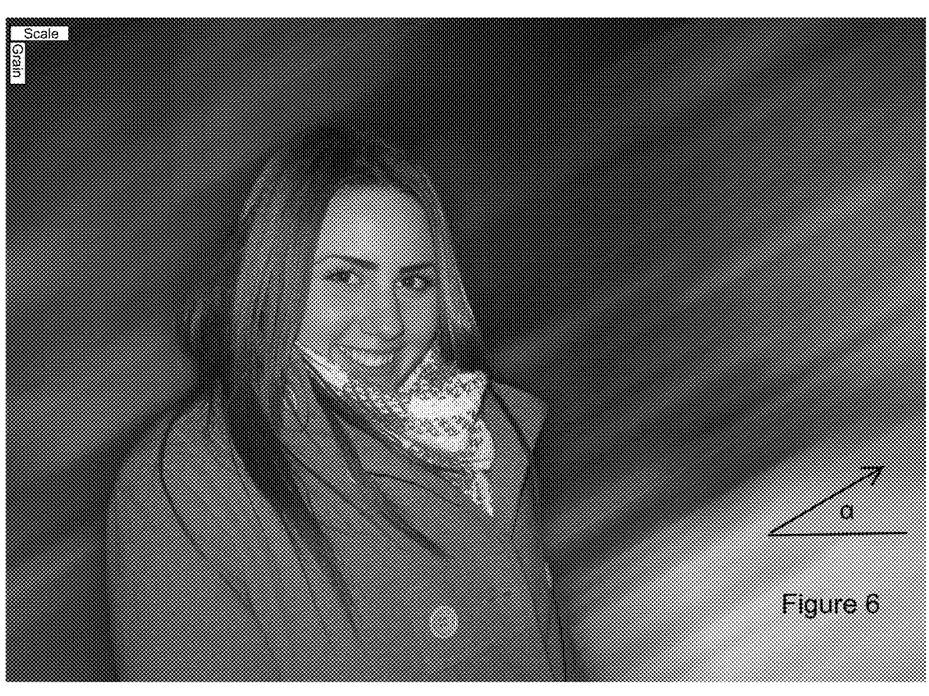
FIG. 6 shows an example of an image with angled motion blur using an embodiment of the invention.

If the motion blur is required at an angle α to the horizontal, FIG. 6, the image is first rotated through a desired angle α using, for example, bilinear interpolation to generate a rotated image consisting of orthogonal rows and columns of interpolated pixels, apply the method above to the rotated image, and then rotate the image back through the same angle again using bilinear interpolation.

As with the approach of FIG. 5, the granularity of the blurred image can be varied by varying the sub-sampling applied when rotating the original image prior to blurring, with increased sub-sampling providing more discrete blurring strata. Of course, this also reduces processing.

As seen in FIG. 4, the digital image there shown has a non-blurred foreground region 20. This is handled as follows. First, known image segmentation techniques are used to distinguish the foreground from the background and so define a map indicating pixels as either background or foreground.

Suitable techniques for providing such foreground/background maps are disclosed in; WO2007/095477 (Ref: FN-140) referred to above; WO2007/025578 (Ref: FN-122) which discloses a flash based foreground/background segmentation approach; and WO2007/093199 (Ref: FN-119) which foreground/background segmentation based on DCT coefficient analysis.

Next, for each row of the image the cumulative sum of the background pixels are calculated. The cumulative sum may be calculated along the entire row, i.e. including the foreground region, or just along the background region. Where there is more than one background region on the same row, e.g. on either side of a foreground object, the cumulative sum may be calculated separately for each background region of the row, omitting the foreground region. It is immaterial whether the foreground region is included in the cumulative sum since the process is based on the difference between cumulative sums, not their absolute values. Finally, steps 3 and 4 above are performed on the horizontal background regions. This process can be used in any case where only a portion of an image is to be blurred, whether background, foreground or any other. The boundary of the area to be blurred is identified and the same process is used as for background/foreground segmentation.

In some cases the kernel may have two or more non-contiguous horizontal regions along the same row of pixels, for example, a U-shaped kernel. This is simply dealt with by treating each horizontal region individually, in the manner described above, without regard to whether or not it is on the same row as another.

In the examples of FIG. 4-6 an image is represented in Cartesian coordinates with I(i, j) values corresponding with x, y locations of the image or a rotated version of the image.

Figure 7:
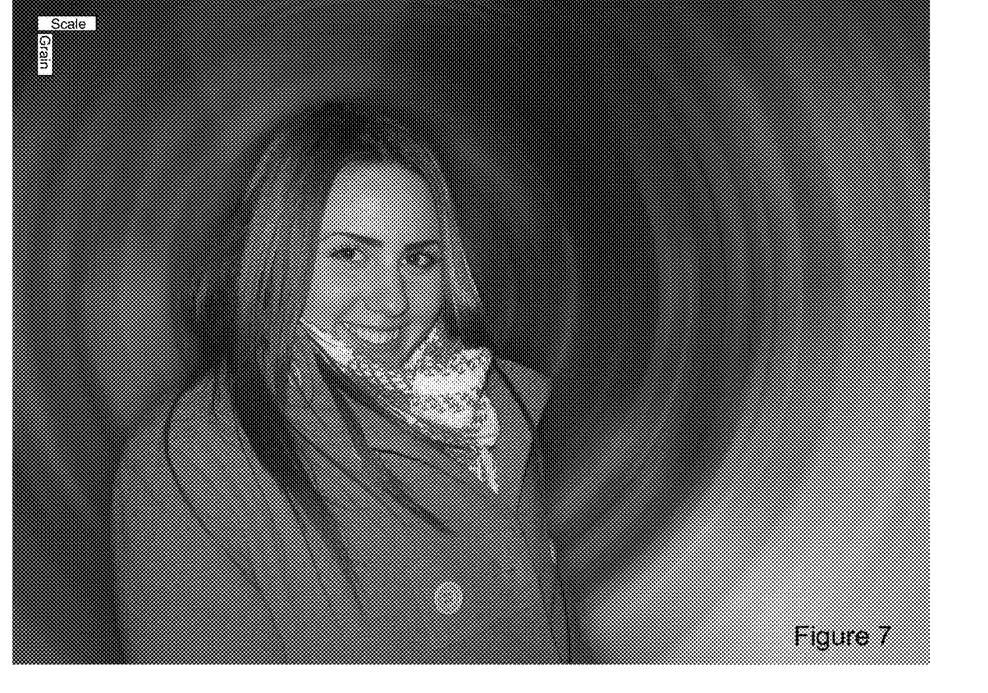
FIG. 7 shows an example of an image with spin motion blur using an embodiment of the invention.
Figure 8:
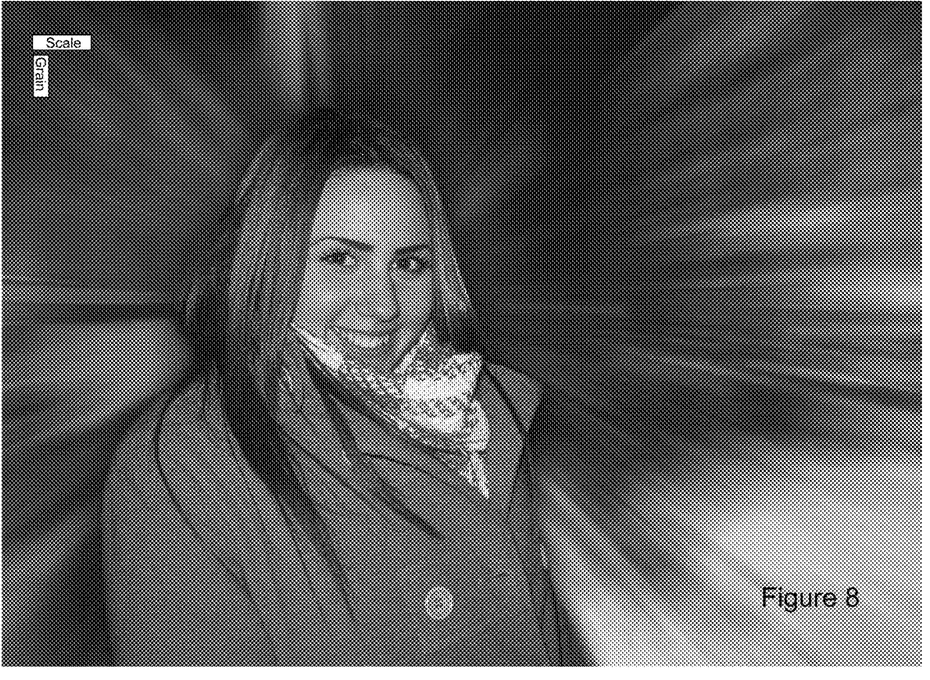
FIG. 8 shows an example of an image with zoom motion blur using an embodiment of the invention.

Referring now to FIGS. 7 and 8, there are shown two further examples of blurring based on the above described technique.

In each case, the original image is converted from Cartesian coordinate space into r,Θ Polar coordinate space. Thus each row of an I(i, j) array now corresponds with a radius extending from an origin of the Polar space, whereas each column of the I(I, j) array now corresponds with an angle relative to the origin.

The origin for the transformation can be chosen through a number of different mechanisms. For example, the origin can simply be chosen as the centre of the original image; if a main face has been detected within an image, such as the subject in each of FIGS. 4-8, the origin can be automatically selected as the centre of the face; of alternatively, the origin can be manually selected by a user through interaction with a blur module application 90.

Again, the granularity of the strata produced in the blurred image depend on the extent of sub-sampling involved when converting the image from the original Cartesian coordinate space to Polar coordinate space.

Figure 9:
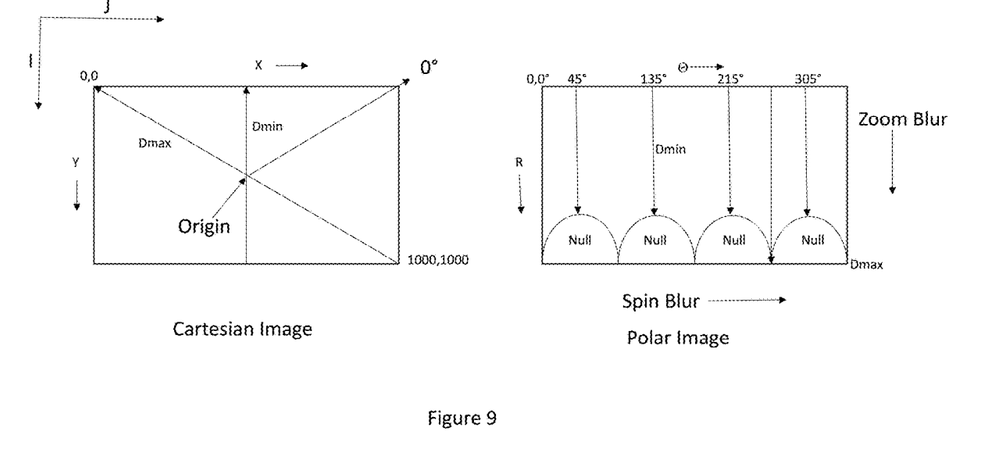
FIG. 9 illustrates a transformation from Cartesian coordinate space to Polar coordinate space.

Thus, referring to FIG. 9, an original image with 1000× 1000 pixels might be converted into a 200×90 array of Polar coordinates, in this case, each column of the array would cover 4 degrees of the image.

It will also be appreciated that the conversion will result in a number of null valued pixels within the Polar image array. When a kernel overlaps with such pixels, processing can be handled as with the processing of any other background pixels adjacent an edge of the image; or adjacent a foreground section of the image as explained below.

In any case, once a Polar image array has been produced, a sum image can be calculated from the intensity values of the Polar image array as described for FIGS. 4-6.

For spin blur, FIG. 7, the sum image is calculated by summing along the rows R of the polar image array, whereas for zoom blur, FIG. 8, the sum image is calculated by summing along the columns Θ of the polar image array.

In order to apply spin blur, a horizontal 1D kernel is applied to successive background pixels along rows of the polar image array. In order to apply zoom blur, a vertical 1D kernel is applied to successive background pixels along columns of the polar image array.

Once blurring has been applied, the blurred pixel values are mapped back to Cartesian coordinate pixel values for background pixels of the original image to create the effects shown in FIGS. 7 and 8.

It will be seen from the above that embodiments of the present invention provide a number of different blurring techniques based on a common kernel processing technique to users of image acquisition devices such as the device 20. The blur module 90 can therefore occupy a relatively small code footprint while at the same time providing extremely efficient processing to blur images as required.

In applications such as the blur module application 90, a user can be presented with a menu of blurring options for an acquired image, the menu options comprising: a custom 2D kernel such as shown for FIG. 4; motion blur such as shown in FIG. 5 (and possibly angled motion blur such as shown in FIG. 6, with the user being able to specify an angle α through for example, a touch gesture on the screen 100); spin blur as shown in FIG. 7; and zoom blur as shown in FIG. 8.

In each case, the blurring can be readily customised through simple user interface controls. So for example, as explained above, the custom 2D kernel can be changed by simply selecting and de-selecting pixels within a matrix—indeed the size of the matrix can also be selected by the user and then the kernel stored for later use. As described in relation to FIG. 6, the angle α can be specified once the angled motion blur option has been selected, by presenting the user with the original image (or a previously blurred version of the image) and in response to a user gesture specifying the angle α. For each of motion, angled motion, spin and zoom blur, once selected, the user can specify the extent of blurring and the granularity of blurring either through interaction with user interface widgets temporarily superimposed on the original image (or a previously blurred version of the image), such as the scale and grain widgets illustrated in FIGS. 5-8; or through specified touch screen gestures such as pinch or swipe.

As mentioned above, there are a number of edge conditions which may need to be handled when blurring an image such as when portions of a kernel overlap with edges of the image, foreground pixels or null pixels (in Polar space).

One technique for dealing with such situations is to recalculate the kernel to include only pixels corresponding with valid background images pixels, to sum these and to normalise accordingly.

It will also be appreciated that while the above embodiments are described in terms of rows and columns and processing in horizontal or vertical directions, variants of these embodiments can readily transpose these rows and columns and directions as required.

Finally, it will be seen that while in the exemplary kernel illustrated in FIGS. 2-4, each of the kernel elements is valued 1, in variants of this example the user could specify some kernel elements with higher values than others. So, for example, the centre row of the kernel in FIGS. 2 and 3 could have values 1,1,1,5,5,5,1,1,1 running left to right so emphasising the centre value. In this case, in step 2 of the method described above the centre row of the kernel could be analysed into three horizontal regions of similarly valued elements {1,1,1}, {5,5,5} and {1,1,1} respectively. Each such region would be processed independently of the others and the difference calculated according to step 3 of the above method would be multiplied by 5 for that region; and the scaling factor for the kernel would increase to 56 from 41. In an alternative analysis, such a kernel row could be divided into two kernel regions, a first region comprising elements {1,1,1,1,1,1,1,1,1} and a second kernel region overlapping with the centre elements of the first region comprising elements {4,4,4}. This would produce the same result as previously, but with fewer operations. In other embodiments the scaling factor could be chosen independently of the size of the kernel or the values of the kernel elements, for example, to lighten or darken the portion of the image being processed. Also, an entire horizontal region of the kernel could have a different value to the other horizontal regions, say all 5 s where the rest of the rows are all 1 s or other value.

The invention is not limited to the embodiments described herein which may be modified or varied without departing from the scope of the invention.

The invention claimed is:

1. A method of processing at least a portion of a digital image comprising rows of pixels extending in two perpendicular directions over a 2D field, the method comprising:
    for each pixel in at least a row of pixels within said image portion, calculating a cumulative sum for said pixel as a sum of a value of said pixel and a value representing a sum of values of preceding pixels in the same row of pixels, wherein the values used for calculating the cumulative sum for said pixel include only values of pixels in the same row of pixels; and convolving a region of a kernel with the image portion, wherein a target pixel in the image is aligned with a specified element of the kernel region, including at least determining a difference between the cumulative sum for said pixel and a cumulative sum for at least one other pixel of the row of pixels, to determine a value for the target pixel.

2. A method according to claim 1, further comprising providing a plurality of pre-defined kernels for selection by a user, receiving from a user a selection of one of said pre-defined kernels, and using a region of said selected kernel as the kernel region for processing said image portion.

3. A method according to claim 1, wherein the pixel value is an intensity value.

4. A method according to claim 1, wherein the pixel value is a colour value.

5. A method according to claim 1, wherein the portion of the digital image is a background portion of said image.

6. A method according to claim 1, further comprising rotating a predecessor digital image through an angle to provide said digital image.

7. A method according to claim 1, wherein the digital image is represented by Cartesian coordinates.

8. A method according to claim 1, wherein the digital image is represented by polar coordinates.

9. A method according to claim 8, wherein said digital image represented by polar coordinates is derived from a predecessor digital image represented by Cartesian coordinates, wherein in said polar digital image, rows of pixels in one orthogonal direction correspond to respective radial distances from an origin in said Cartesian predecessor image, and rows of pixels in the other orthogonal direction correspond to respective angular displacements about said origin in said Cartesian predecessor image.

10. A method according to claim 1 further comprising setting a resolution for an image including said processed target pixel value in response to user interaction.

11. A method according to claim 1 wherein said kernel comprises one row of contiguous elements of the same non-zero value, said method comprising setting a length of said kernel in response to user interaction.

12. A method according to claim 6 further comprising setting said angle for said rotation in response to user interaction.

13. A method according to claim 1, wherein:
the row is a first row;
the method further comprises, for each pixel in at least a second row of pixels within said image portion, calculating a cumulative sum for said pixel as a sum of a value of said pixel and a value representing a sum of values of preceding pixel values pixels in the second row of said image portion pixels; and
convolving the region of the kernel with the image portion further includes at least determining a difference between the cumulative sum for said pixel and a cumulative sum for at least one other pixel of the second row of pixels, to determine the value for the target pixel.

14. A method according to claim 13, wherein:
convolving the region of the kernel with the image portion further includes at least
determining a sum of the difference between the cumulative sums for the two pixels of the second row and the difference between the cumulative sums for the two pixels of the second row, to determine the value for the target pixel; and
multiplying the differences sum by the element values of the kernel region.

15. A method according to claim 13, wherein:
convolving the kernel with the image portion further includes at least
determining a sum of the difference between the cumulative sums for the two pixels of the second row and the difference between the cumulative sums for the two pixels of the second row, to determine the value for the target pixel; and
normalising said differences sum as a function of a number of elements in the kernel.

16. An image processing application for an image processing device, the image processing application being arranged to perform the steps of claim 1.

17. The application of claim 16 being arranged to provide a plurality of blurring options for an acquired image including: at least one custom 2-dimensional kernel based blur; and one or more of a motion blur, zoom blur or a spin blur.

18. An image processing system, comprising:
memory configured to store at least a portion of a digital image comprising rows of pixels extending in two perpendicular directions over a 2D field;
at least one processor configured to perform operations including:
for each pixel in at least a row of pixels within said image portion, calculating a cumulative sum for said pixel as a sum of a value of said pixel and a value representing a sum of values of preceding pixels in the same row of pixels, wherein the values used for calculating the cumulative sum for said pixel include only values of pixels in the same row of pixels; and
convolving a region of a kernel with the image portion, wherein a target pixel in the image is aligned with a specified element of the kernel region, including at least determining a difference between the cumulative sum for said pixel and a cumulative sum for at least one other pixel of the row of pixels, to determine a value for the target pixel.

19. The image processing system of claim 18, the operations further comprising:
providing a plurality of pre-defined kernels for selection by a user, receiving from a user a selection of one of said pre-defined kernels, and using a region of said selected kernel as the kernel region for processing said image portion.

20. The image processing system according to claim 18, wherein:
the row is a first row;
the operations further comprise, for each pixel in at least a second row of pixels within said image portion, calculating a cumulative sum for said pixel as a sum of a value of said pixel and a value representing a sum of values of preceding pixel values pixels in the second row of said image portion pixels; and
convolving the region of the kernel with the image portion further includes at least determining a difference between the cumulative sum for said pixel and a cumulative sum for at least one other pixel of the second row of pixels, to determine the value for the target pixel.

* * * * *